United States Patent
Pappalardo et al.

(10) Patent No.: US 7,358,868 B2
(45) Date of Patent: Apr. 15, 2008

(54) METHOD AND CIRCUIT SYSTEM FOR THE SYNCHRONOUS TRANSMISSION OF DIGITAL SIGNALS THROUGH A BUS

(75) Inventors: Francesco Pappalardo, Paterno (IT); Agatino Pennisi, Nocera Inferiore (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 858 days.

(21) Appl. No.: 10/757,368

(22) Filed: Jan. 13, 2004

(65) Prior Publication Data
US 2004/0202244 A1    Oct. 14, 2004

(51) Int. Cl.
*H03M 5/00* (2006.01)
(52) U.S. Cl. .......................... 341/55; 711/220
(58) Field of Classification Search ............. 341/55, 341/51, 50; 711/220
See application file for complete search history.

(56) References Cited

U.S. PATENT DOCUMENTS

| | | | |
|---|---|---|---|
| 5,418,795 A * | 5/1995 | Itakura et al. ............. 714/746 |
| 5,561,772 A | 10/1996 | Dornier | |
| 6,266,722 B1 | 7/2001 | Ogura | |
| 2003/0005189 A1 * | 1/2003 | Wilson et al. ............ 710/33 |
| 2003/0051120 A1 * | 3/2003 | Fallah et al. ............ 711/220 |

FOREIGN PATENT DOCUMENTS

DE  3132929  3/1983

OTHER PUBLICATIONS

European Search Report, EP 03 07 9150, dated Jul. 9, 2004.

* cited by examiner

*Primary Examiner*—Jean Bruner Jeanglaude
*Assistant Examiner*—Joseph Lauture
(74) *Attorney, Agent, or Firm*—Gardere Wynne Sewell LLP

(57) ABSTRACT

N binary signals are transmitted through a bus of m leads, where m<n, at the rhythm of a train of clock pulses by encoding a first signal on a second signal. The encoding provides for the information associated with the first signal to be included in the second signal within a predetermined time interval of the clock period preceding each reading clock pulse. In this way one obtains a reduction of the switching activity on the bus and therefore a reduction of the energy consumption.

21 Claims, 4 Drawing Sheets

METHOD AND CIRCUIT SYSTEM FOR THE SYNCHRONOUS TRANSMISSION OF DIGITAL SIGNALS THROUGH A BUS

PRIORITY CLAIM

The present application claims priority from Italian Application for Patent No. RM2003A000012 filed Jan. 14, 2003, the disclosure of which is hereby incorporated by reference.

BACKGROUND OF THE INVENTION

1. Technical Field of the Invention

The present invention relates to a method for the synchronous transmission of binary digital signals through a bus and also relates to a circuit system for implementing this method.

2. Description of the Related Art

In the design of complex digital electronic systems comprising various devices connected to each other by means of transmission bus-lines it is well known that the number of transitions of the data sent on the bus (bus switching activity) has a considerable effect on the overall energy consumption of the system.

Various techniques are known for reducing the bus switching activity that are based on encoding the data to be transmitted. The techniques most widely employed with small buses, for example up to eight leads for the transmission of a like number of binary digital signals (bits), make a comparison between two successive logic states of the bits to be transmitted. If the comparison shows that half, or less than half, of the bits have to pass from one state to the other, the bits are routed on the bus without any intervention. However, if more than half the bits have to pass from one state to the other, all the bits are inverted before they are routed. In this way the number of transitions on the transmission bus is minimized (Bus-Invert Coding) and the energy consumption is limited.

SUMMARY OF THE INVENTION

The present invention proposes a method and a circuit system for the synchronous transmission of binary digital signals through a bus that will make it possible to reduce the switching activity of the transmission bus at a small cost in terms of hardware. Advantageously, the present solution can be utilized also in combination with other known techniques.

In accordance with one embodiment, the signals to be transmitted are compressed in such a way as to reduce their number. Received signals so transmitted through the bus are decompressed until their number is again equal to what it was before the encoding.

Preferably, the compression operation comprises the selection, from among the signals to be transmitted, of a first and a second signal and the encoding of the first signal on the second signal to obtain an encoded signal. The decompression operation comprises the decoding of the encoded signal to obtain a first and a second output signal that reproduce, respectively, the first and the second signal.

According to a preferred embodiment of the invention, there is chosen, from among the leading edges and the trailing edges of a train of clock pulses, a leading edge to serve as a reading front of the signals. The encoding provides for the information associated with the first signal to be included in the second signal within a predetermined time interval of the clock period preceding each reading clock pulse.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
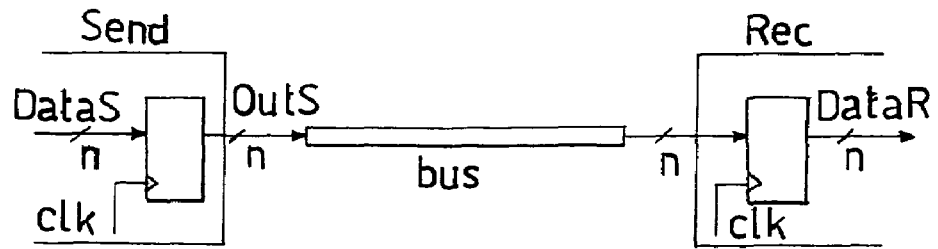
FIGS. 1 and 2 show representations in schematic form of a transmission system without encoding and a transmission system in accordance with the invention.

Referring to FIG. 1, the final stage of a data transmission device is indicated by "Send" and the input stage of a data reception device is indicated by "Rec." Send and Rec are connected by a bus of n leads.

The final stage of the transmission device Send comprises n flip-flops of type D, each of which has an input on which there is applied one bit of a binary digital signal (DataS) consisting of n bits to be transmitted on the bus. Each flip-flop further includes an output, connected to one lead of the bus, on which there will appear one bit of a digital output signal OutS of the transmission device Send. Each flip-flop further includes a control terminal to which there is applied a clock signal clk.

The input stage of the data reception device Rec likewise comprises n flip-flops of type D. Each flip-flop has an input connected to one of the n leads of the bus, an output on which there will appear one bit of the received digital signal (DataR) and a control input to which there is applied the clock signal clk.

The input signal DataS is transmitted by simply routing on each of the n leads of the bus one of the n bits of the signal at every pulse of the clock signal and is read as an n-bit output signal on the outputs of the n flip-flops of the reception device Rec at the rhythm of the same clock signal clk and, more precisely, in the period successive to the transmission period and on the same edge on which the transmission was effected.

Figure 2:
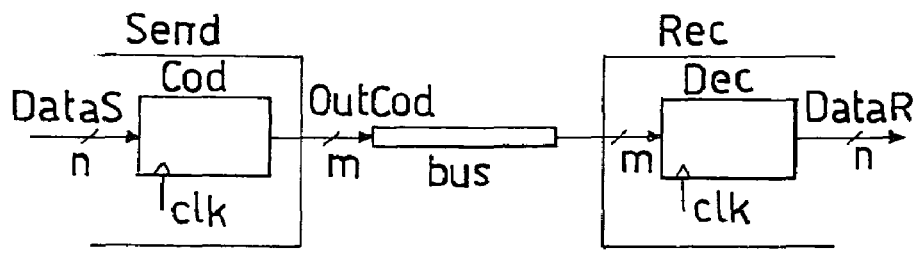

FIG. 2 shows a final stage of a transmission device, again indicated by "Send", and the input stage of a reception device, again indicated by "Rec". Send and Rec are connected to each other by means of a bus consisting of m leads (where m<n).

The final stage of the transmission device Send comprises an encoder Cod having n inputs, on each one of which there is applied one bit of an n-bit input signal (DataS). The encoder Cod has m outputs, which jointly constitute an output signal OutCod of the transmission device Send. Each of the Cod outputs is connected to one lead of the bus. The encoder Cod further includes a control terminal to which there is applied a clock signal clk. The encoding operation performed by Cod compresses the input signal DataS into a signal OutCod having a smaller number of bits, so that potentially the switching activity on the bus will likewise be reduced.

The input stage of the reception device Rec comprises a decoder Dec having m inputs, each of which is connected to one lead of the bus. The decoder Dec further includes n outputs on which there will appear n bits of a signal DataR that reproduces the digital signal DataS. The Dec further includes a control input to which there is applied the control signal clk.

Before examining a practical embodiment of the system of FIG. 2, let us consider the case in which a signal constituted by a multiplicity of binary digital signals (bits) has to be transmitted through a bus by means of a transmission synchronous with a clock period T having a duty cycle of 50% and a propagation time of the signal on the bus of less than T/2. Given these conditions, every bit of the transmitted signal will be available at the output of the bus after a time T/2 has elapsed from its introduction into the bus. Consequently, if it is decided to read the signal, for example, on the leading edge of the clock pulse, one could choose to send the signal alternatively as it presents itself on the leading edge or as it presents itself on the trailing edge of the clock pulse. According to the invention, this possibility of choice is utilized for sending with one of the bits of the signal to be transmitted supplementary information relating to another bit of the signal to be transmitted or, to put it in other words, to encode one bit on another.

Let us consider the simplest case in which n=2, that is to say, when two bits have to be transmitted on a bus. According to the invention, one bit can be encoded on the other, and it will therefore be sufficient to have a bus having a number of leads m<n, i.e., a single lead, to transmit the entire information contained in the two bits.

Figure 3:
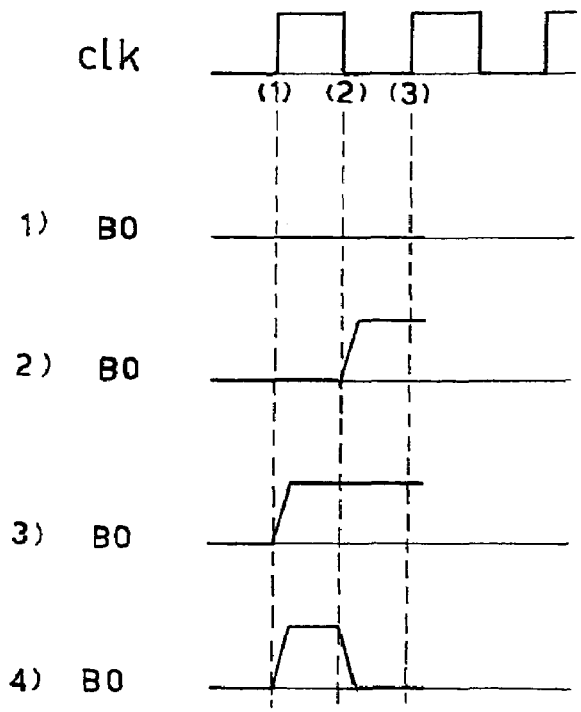
FIG. 3 shows some wave forms of a signal encoded in accordance with the method of the invention.

To understand how the encoding is performed, let us consider, referring to FIG. 3, a specific case in which B0 and B1 are two bits to be transmitted on a single lead and it is decided to encode B1 on B0 and to transmit B0 at the rhythm of a clock signal clk.

Let us also assume that the transmitted bit B0 is read in the receiver on the leading edge of a clock pulse (edge 3) and that the leading edges (edge 1) and the trailing edges (edge 2) of the preceding clock pulse have been used for reading the information relating to the other bit (B1). Let us suppose that the two bits have a binary value 0 at the beginning of the transmission, that is to say, B0(t−1)=0 and B1(t−1)=0 before the leading edge of the clock pulse in transmission (edge 1), where t−1 is an instant of the clock period that precedes the clock pulse in which the present value of the bit is considered.

By way of example, let us consider the four cases represented in FIG. 3.

1) It is desired to transmit B0=0 and B1=0, i.e.,:

$B0(t-1)=0, B0(t)=0$ $B1(t-1)=0, B1(t)=0$

In this case the transmitted signal is devoid of transitions, so that on edge 3 on the output side of the bus we shall have B0=0. Furthermore, from the fact there has not been any change in B0 between the leading edge and the trailing edge (edges 1 and 2) we can deduce that B1 has not changed, so that B1 can be reconstructed in the receiver maintaining its previous value, i.e., the value 0.

2) It is desired to transmit B0=1 and B1=0, i.e.,:

$B0(t-1)=0, B0(t)=1$ $B1(t-1)=0, B1(t)=0$

In this case we shall have B0=1 on edge 3 on the output side of the bus, and from the fact there has not been any change in B0 between the leading edge and the trailing edge (edges 1 and 2) we can deduce that B1 has not changed, so that B1 can be reconstructed in the receiver maintaining its previous value, i.e., the value 0.

3) It is desired to transmit B0=1 and B1=1, i.e.,:

$B0(t-1)=0, B0(t)=1$ $B1(t-1)=0, B1(t)=1$

In this case we shall have B0=1 on edge 3 on the output side of the bus, and from the fact there has been a change between edge 1 and edge 2 we can deduce that B1 has changed, so that B1 can be reconstructed in the receiver inverting its previous value, i.e., assigning it the value 1.

4) It is desired to transmit B0=0 and B1=1, i.e.,:

$B0(t-1)=0, B0(t)=0$ $B1(t-1)=0, B1(t)=1$

In this case we shall have B0=0 on edge 3 on the output side of the bus, and from the fact there has been a change between edge 1 and edge 2 we can deduce that B1 has changed, so that B1 can be reconstructed in the receiver inverting its previous value, i.e. assigning it the value 1.

As brought out by the examples described above, the information relating to B1 can be transmitted on a single lead together with B0 by altering B0 temporarily and, more precisely, altering it in the interval comprised between the two edges of the clock pulse preceding the clock pulse for reading the bit B0.

Figure 4:
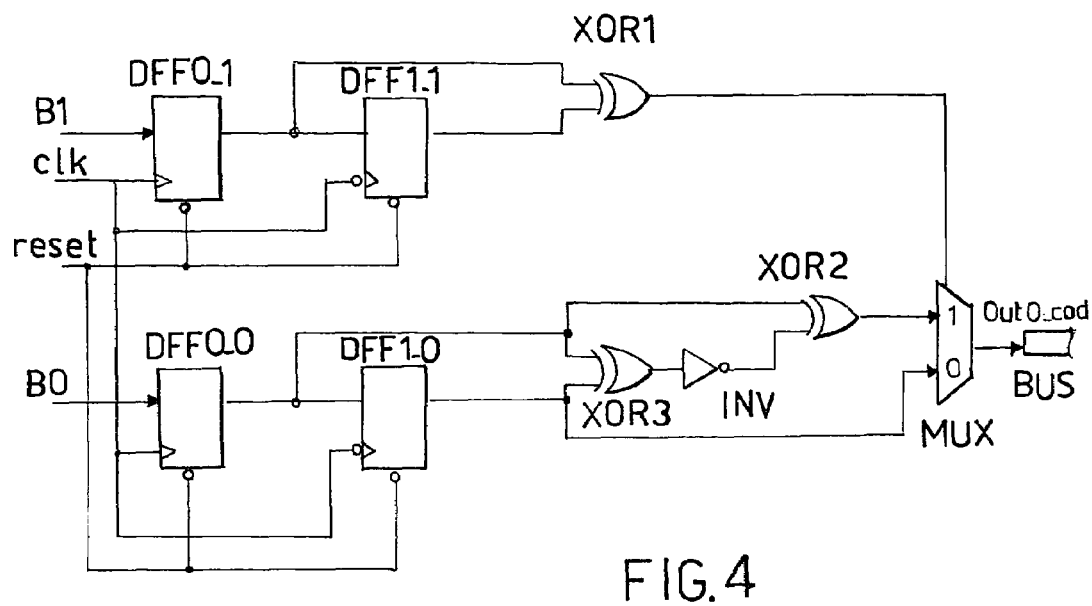
FIGS. 4 and 5 show, respectively, an encoder and a decoder in accordance with a first embodiment of the invention.
Figure 5:
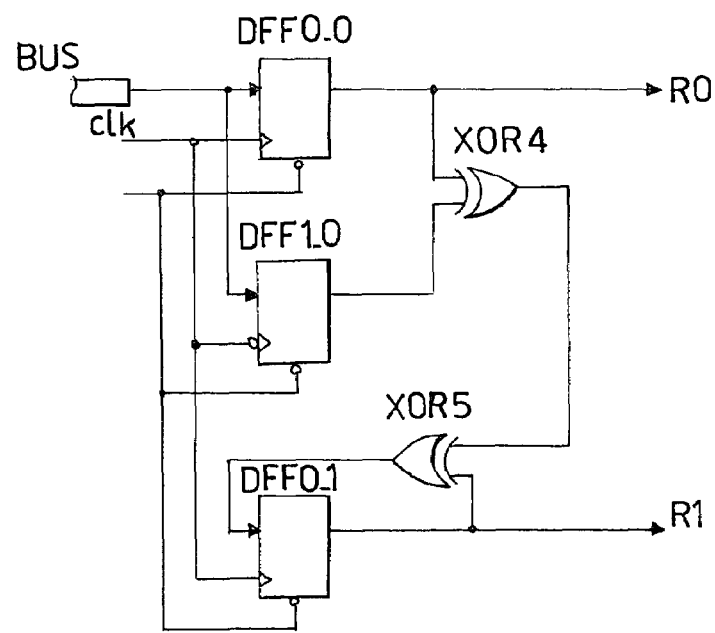

A system for implementing the method of the invention is illustrated by the logic block diagrams of FIGS. 4 and 5.

The encoder of FIG. 4 comprises a first bank of two registers (DFF0_0, DFF0_1) active on the leading edges of the clock signal and a second bank of two registers (DFF1_0, DFF1_1) active on the trailing edges of the clock signal. Each register can be constituted by a D-type flip-flop, that is, a flip-flop with a data input, a data output, a control terminal (clk) and a reset terminal. This flip-flop is capable of transferring to its output a binary signal applied to its input whenever a clock pulse appears on its control terminal and to maintain it unvaried until such time as there arrives a binary signal of different value on the occasion of the subsequent clock pulse. For as long as it is active, the reset signal assigns the logic value 0 to the outputs: in our case the reset is active when it is at the low logic value (0). The flip-flop may be realized in such away as to be sensitive to the leading edge or the trailing edge of the clock signal. In the figure the flip-flops sensitive to the trailing edge are represented with a small circle on the control terminal.

A clock signal (clk) is applied to the control terminal of the four registers and a reset signal to their respective reset terminals. On the inputs of the registers of the first bank there are applied, respectively, the binary signals B0 and B1. The outputs of the registers of the first bank are each connected to an input of a register of the second bank. The outputs of the registers DFF0_1 and DFF1_1 are each connected to an input terminal of an XOR (exclusive OR) logic gate, indicated by XOR1, and the output of the gate XOR1 is connected to the control terminal a multiplexer MUX. The multiplexer MUX has a first input terminal, indicated by 0, connected directly to the output of the register DFF1_0 and a second input terminal, indicated by 1, connected to the output of the register DFF0_0 through two XOR logic gates (XOR2 and XOR3) and inverter INV. The signals that arrive at the inputs of the multiplexer MUX are selectively transferred to the output side according to the binary value present at the control terminal. The output of the multiplexer MUX is connected by means of a lead BUS to a decoder (FIG. 5).

An examination of the block diagram of FIG. 4 shows that a 0 will be present at the output of the gate XOR1 when the two registers DFF0_1 and DFF1_1 contain the same data, that is to say, when the most recent state of B1 present at the output of DFF0_1 is equal to the state present on the output of DFF1_1 that B1 had on the leading edge of the preceding clock pulse, while a 1 will be present when the two registers contain different data, i.e., when B1 has changed state during the last clock period. In the first case the signal out0_cod present at the output of the multiplexer MUX will be equal to the signal B0 present at the output of the register DFF1_0, in the second case the signal out0_cod will contain not only the information of the signal B0, but also the information relating to the variation of B1. The latter information can be obtained by examining B0 in the period preceding the leading edge of the clock pulse on which B0 will be read. More particularly, whenever B0 has changed during the last clock period, the output of XOR1 is 1 and the output of the inverter INV is 0. Therefore, the output out0_cod of the encoder, which is equal to the output of XOR2, is 1 or 0 when the output of DFF0_0 is, respectively, 1 or 0. At the output of the encoder, on the trailing edge of the clock pulse preceding the leading edge of the reading pulse, out0_cod will either be inverted or not inverted with respect to B0. In practice this means that the signal B0 will be transferred to the output side as it appears on the trailing edge or as it appears on the leading edge of the clock pulse according to whether the signal B1, respectively, has or has not undergone a variation.

The decoder of FIG. 5 comprises two registers DFF0_0 and DFF1_0 active, respectively, on the leading edge and the trailing edge of the clock pulse. These registers, immediately after a leading edge, contain, respectively, the state of B0 on the leading edge of the clock pulse following the encoding pulse and the state of B0 in the preceding clock period. The outputs of the two registers are applied as inputs to an XOR gate, indicated by XOR4 that has its output connected to the input of another XOR gate (XOR5). A third register DFF0_1, active on the leading edge of the clock pulse, has its input connected to the output of the gate XOR5 and its output connected to another input of the same gate XOR5.

An examination of the logic block diagram of FIG. 5 makes it clear that the combination of the gate XOR5 and the register DFF0_1 has the effect of an inverter. The gate XOR4 has the function of comparing the state of the signal B0 contained in the register DFF0_0 with the state of the signal B0 in the preceding clock period (contained in the register DFF1_0): when B0 has not changed, the output of XOR4 is 0, so that the inversion of the signal at the output of the register DFF0_1 will not be activated and the signal R1 remains unvaried, whereas, whenever B0 has changed, the output of XOR4 is 1, so that the inversion of the signal at the output of the register DFF0_1 is activated and the signal R1 will be inverted. At the output of the register DFF0_0 one thus obtains a signal R0 that reproduces the signal B0, while a signal R1 that reproduces the signal B1 is obtained at the output of the register DFF0_1, both with a delay equal to the clock period.

The synchronous transmission system that has just been described makes it possible to transmit two bits on a single lead, subject to the sole condition that the propagation time in the lead must be shorter than the duration of a clock pulse, i.e., shorter than T/2, where T is the clock period, if the duty cycle is 50%.

Thanks to the reduction of the switching activity, the energy saving as compared with transmission on two leads is considerable, even though it is limited by the fact that, whenever a variation occurs between edge 1 and edge 2 to encode an inversion of B1 and B0 does not have to change (case 4 of the examples illustrated by FIG. 3), two successive transitions are needed (i.e., one corresponding to edge 1 and the other corresponding to edge 2). In this case, therefore, the transitions on the bus are twice as numerous as in the other cases and this reduces the overall efficiency of the encoding/decoding process.

The described method can, of course, be used for the transmission of any number of bits, which makes it possible to halve the number of leads in the bus and to obtain a considerable energy saving. Nevertheless, when more than two bits have to be transmitted on a bus, it will be advantageous to encode a bit on a number of bits greater than 1. It has been found that the proper compromise between efficiency of the encoding/decoding method and reduction of the number of leads in the bus is to encode one bit on two other bits that have to be transmitted.

An example of encoding a bit on two bits will now be described with reference to FIG. 6.

Figure 6:
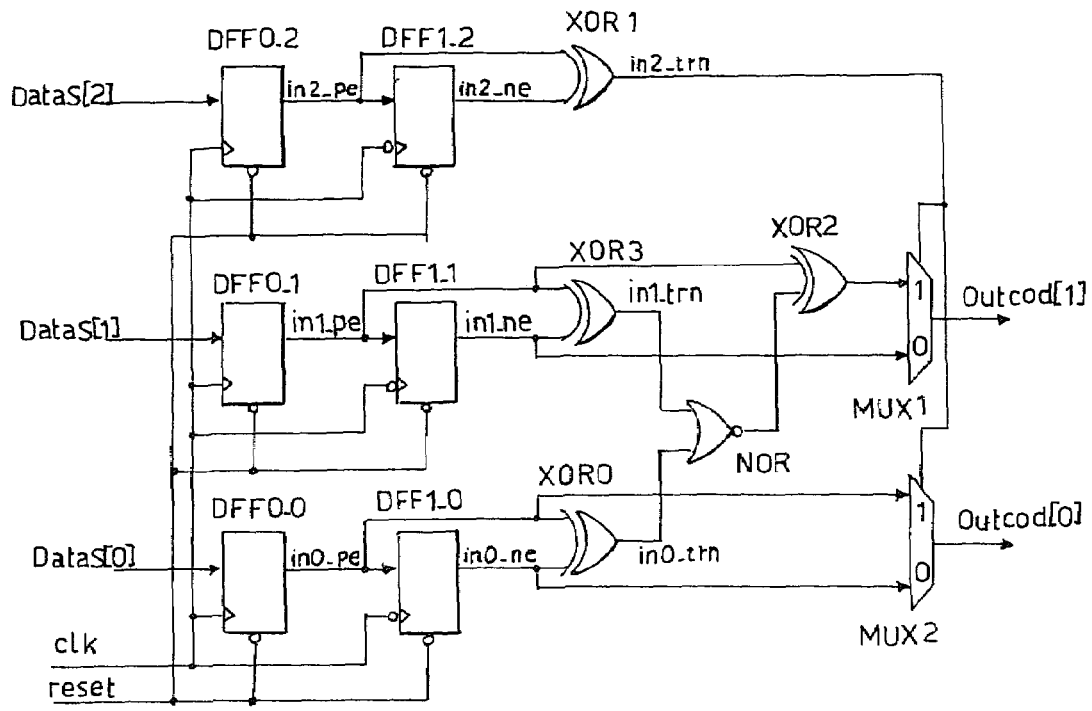
FIGS. 6 and 7 show, respectively, an encoder and a decoder in accordance with another embodiment of the invention.

The encoder represented in FIG. 6 comprises a first bank of three registers (DFF0_0, DFF0_1, DFF0$_2$) active on the leading edge of the clock signal and a second bank of three registers (DFF1_0, DFF1_1, DFF1_2) active on the trailing edge of the clock signal. Each register may be constituted by a D-type flip-flop. As can be seen, the encoder is similar to the one of FIG. 4, but, in order to enable it to process three input signals, contains two extra registers, an additional XOR GATE (XOR0) and an additional multiplexer (MUX2) and also has a NOR gate in place of the inverter. The registers have a control terminal to which the clock signal is applied and a reset terminal to which a reset signal can be applied. Digital signals DataS[0], DataS[1], DataS[2] are applied to respective inputs of the registers of the first bank. The outputs of the registers of the first bank, indicated by in0_pe, in1_pe and in2_p2, are each connected to the input of a register of the second bank. The outputs of the interconnected registers of the two banks are connected to the input terminals of respective XOR (exclusive OR) gates XOR0, XOR3 and XOR1. The outputs pf the two gates XOR0 and XOR3 are connected to the inputs of a NOR gate (i.e., an OR gate with an inverted output). The output of the NOR gate and the output in1_pe of the register DFF0_1 are connected to the inputs of a further XOR gate (XOR2). Each of the two multiplexers MUX1 and MUX2 has a control terminal connected to the output of the gate XOR1 and a pair of input terminals connected, respectively, to the output of the gate XOR2 and the output in1_ne of the register DFF1_1 and the output in0_pe of the register DFF=_0 and the output in0_ne of the register DFF1_0.

Figure 8:
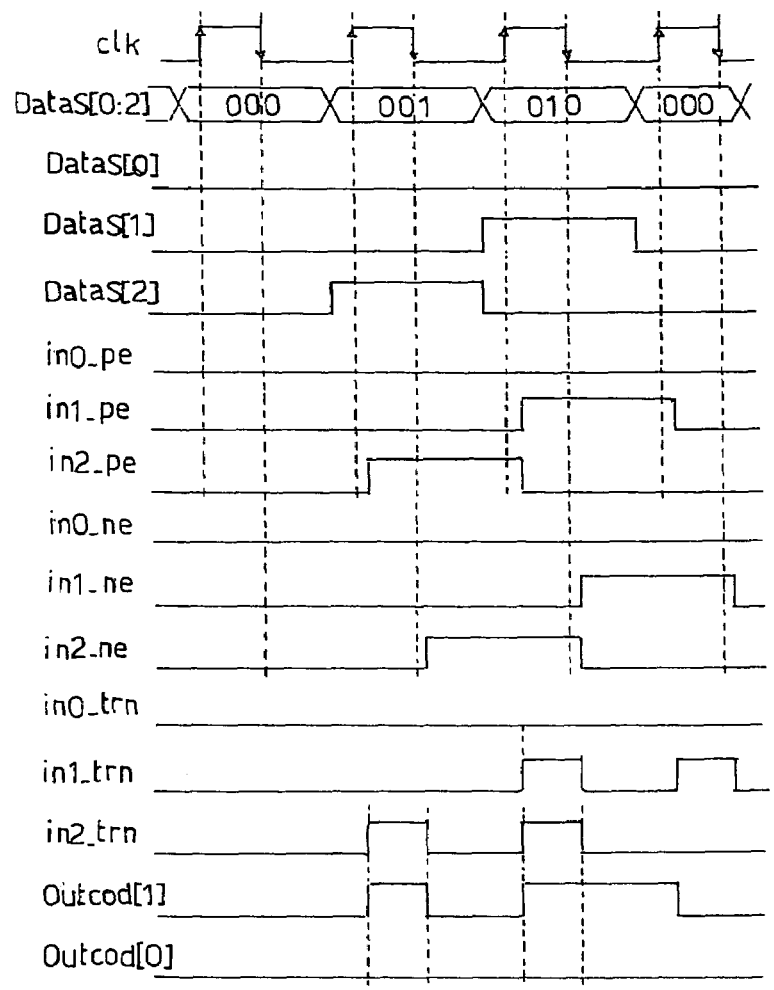
FIGS. 8 and 9 show some waveforms of signals present at various nodes and terminals of, respectively, the encoder and the decoder of FIGS. 6 and 7.

Let us now consider the functioning of the encoder of FIG. 6 with reference to the wave forms shown in FIG. 8. The input signal DataS[0:2] constituted by three binary digital signals (bits), DataS[0], DataS[1] and DataS[2], is compressed into an output signal constituted by two bits Outcod[0], Outcod[1] by encoding the bit DataS[2] on the other two bits.

Let us assume that the input signal DataS[0:2] is stable, i.e., that all the transitions of its bits have become stabilized before each leading edge of the clock pulses (clk) and that it contains a digital code that varies at regular intervals like 000, 001, 010, 000. The outputs of the gates XOR0, XOR3 and XOR1, indicated by, respectively in0_trn, in1_trn and in2_trn, signal the transitions from 0 to 1 and from 1 to 0 on every bit of the input signal DataS[0:2]. The signal in2_trn that signals the transitions of the bit DataS[2] to be encoded controls the multiplexers MUX1 and MUX2 in such a way as to activate the connection 0 whenever a switch (in2_trn=0) has not taken place or the connection 1 whenever a transition (in2_trn=1) has taken place. The output signal Outcod[1] of the multiplexer MUX1 is the one that, over and above the information about the transitions of the input bit DataS[1], carries also the information about the possible transitions of the input bit DataS[2]. In particular, when no transition has occurred on DataS[2], i.e., when in2_trn=0, at the outputs of the two multiplexer we shall have, respectively, Outcod[0]=in0_ne and
Outcod[1]=in1_ne.

But when a transition has taken place on DataS[2], i.e., when in2_trn=1, on the output we shall have Outcod[0]=in0_pe (always), while Outcod[1] depends on the output of the NOR gate. An analysis of the block diagram leads one to deduce that no transition has taken place on either of the two input bits DataS[0] and DataS[1], i.e., in0_trn=in1_trn=0, and we have Outcod[1]=NOT [in1_pe],
otherwise
Outcod[1]=in1_pe.

As brought out by what has just been explained, whenever there has been a transition on DataS[2], the possible transitions on the other two bits occur on the leading edges of the clock pulse, whereas when there has been no transition on DataS[2], the possible transitions on the other two bits occur on the trailing edge of the clock pulse.

Due to the effect of the encoding that has just been illustrated, the output Outcod[1], over and above the information about the input bit DataS[1], contains also the information about the input bit DataS[2]. This information can be extracted from the signal Outcod[1], for example, by means of the decoder shown in FIG. 7.

Figure 7:
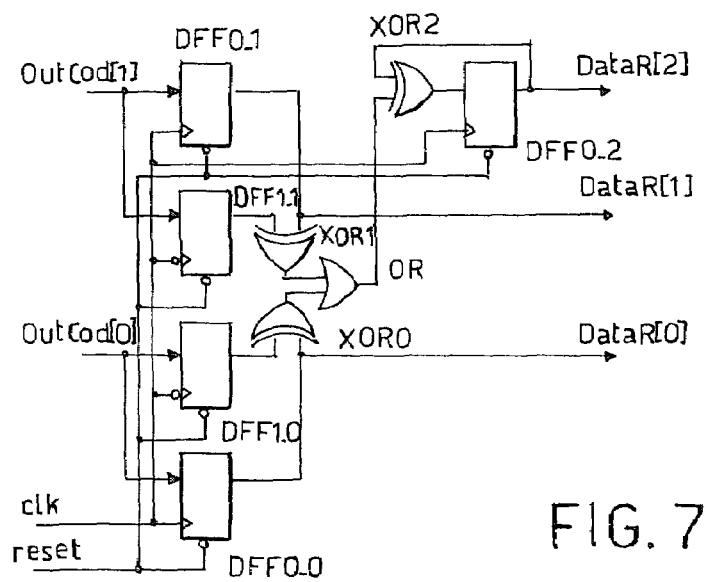

The decoder of FIG. 7 comprises three registers, DFF0_0, DFF=_1 and DFF0_2, active on the leading edge of the clock pulse and two registers, DFF1_0 and DFF1_1, active on the trailing edge. One of two XOR gates (XOR0) has its inputs connected to the outputs of the registers DFF0_0 and DFF1_0 and the other (XOR1) has it inputs connected to the outputs of the registers DFF0_1 and DFF1_1 and its outputs connected to the inputs of an OR gate. The output of the OR gate is connected to an input of a further XOR gate (XOR2). The register DFF0_2 has its input connected to the output of the gate XOR2 and its output connected to the other input of the same gate XOR2. The circuit arrangement constituted by the gate XOR2 and the register DFF0_2 (connected as shown) functions as an inverter. The inputs of the registers DFF0_0 and DFF1_0 are jointly connected to one lead of a bus on which there is active the signal Outcod[0] produced as output by the encoder of FIG. 6, the inputs of the registers DFF0_1 and DFF1_1 are jointly connected to the other lead of the bus on which there is active the signal Outcod[1] produced as output by the same encoder. The outputs of the registers DFF0_0 and DFF0_1 and DFF0_2 are the outputs of the decoder and carry, respectively, the bits DataR[0], DataR[1] and DataR[2] of the signal DataR[0:2].

Figure 9:
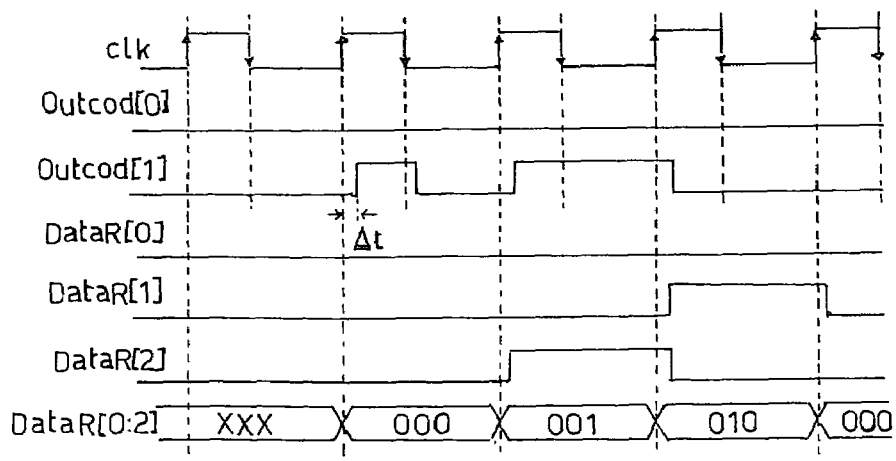

Let us now consider the functioning of the logic circuit of FIG. 7 with reference to the waveforms of FIG. 9.

The output bits DataR[0] and DataR[1] are reconstructed on the output side by memorizing (in the respective registers DFF0_0 and DFF0_1) the respective input signals Outcod[0] and Outcod[1] on the leading edge of the clock signal.

The following operations are carried out in the circuit in order to reconstruct the bit encoded on the signal Outcod[1]:

the signal Outcod[1] memorized in DFF0_1 on the leading edge is compared with the same signal memorized in DFF1_1 on the trailing edge (in this connection it should be noted that the signal memorized in DFF1_1 is the one relating to the previous clock pulse), a similar comparison is made for the signal Outcod[0], if it is found that there are differences between the compared signals, i.e., that the signal Outcod[1] or the signal Outcod[0] has changed, the inversion is activated for the output signal of the register DFF0_2, i.e., for the output bit DataR[2], but if the comparison does not bring out any differences, the inversion is not activated and the output DataR[2] remains unvaried.

The signal DataR[0:2] at the output of the decoder reproduces the signal DataS[0:2] at the input of the encoder with a delay of one clock period. Let us once again assume that in this case the propagation time on the bus is less than the duration of a clock pulse, i.e., less than T/2, where T is the clock period, when the duty cycle is 50%. It should be noted that the delay—indicated by $\Delta t$ in FIG. 9—due to the propagation time on the bus does not influence the data leaving the decoder, but only the (encoded) signal that reaches the decoder from the encoder through the bus.

Although only two embodiments of the invention have here been illustrated and described, it is clear that the method of the invention can be implemented in many different ways by using logic circuits other than those here described. It is also clear that the invention can be advantageously implemented for the transmission of data having any number of bits by encoding more than one bit on the other bits of the transmission bus and that it can be implemented in combination with other encoding/decoding methods.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for the synchronous transmission of an n-bit binary signal through a bus of m leads, where m<n, comprising:

compressing the n-bit binary signal to be transmitted in such a way as to reduce its number of bits to an m-bit binary signal, transmitting the m-bit binary signal over the bus of m leads and decompressing the m-bit binary signal transmitted through the bus until its number of bits is again equal to the n-bit number of the n-bit binary signal prior to the compressing.

2. A method for the synchronous transmission of n binary signals through a bus of m leads, where m<n, comprising:

compressing the signals to be transmitted in such a way as to reduce its number of signals, wherein compressing comprises choosing, from among the signals to be transmitted, a first and a second signal and encoding of the first signal on the second signal in order to obtain an encoded signal; and decompressing the signals transmitted through the bus until their number of signals is again equal to the number of signals prior to the encoding, wherein decompressing comprises decoding of the encoded signal in order to obtain a first and a second output signal that reproduce, respectively, the first and the second signal.

3. The method in accordance with claim 2, wherein, from among the leading edge and the trailing edge of a train of clock pulses, there is chosen one edge as the reading edge of the signals, and wherein encoding provides for the information associated with the first signal to be included in the second signal within a predetermined time interval of the clock period preceding each reading clock pulse.

4. The method in accordance with claim 3, wherein the encoding comprises the following operations:
monitoring the first signal and the second signal to ascertain whether their state does or does not change between two successive clock pulses,
generating the encoded signal according to the following criterion:
when the first signal does not change during the clock period preceding the reading clock pulse, the encoded signal is equal to the second signal delayed by one clock period,
when the first signal changes during the clock period preceding the reading clock pulse, the encoded signal is a signal that differs from the second signal by the fact that it is inverted in the predetermined time interval of the clock period preceding every reading clock pulse when the second signal has not changed in the clock period preceding the reading clock pulse, otherwise, when the second signal has changed in the clock period preceding the reading clock pulse, it remains equal to the second signal in the same predetermined time interval,
and wherein the decoding comprises the following operations:
reading the encoded signal coming from the lead of the transmission bus on the reading edge of the clock pulse following the one which the encoding was effected and sending it as first output signal to a first output terminal,
monitoring the encoded signal to ascertain whether its state has or has not changed in the predetermined time interval and
reconstructing the first signal as second output signal at a second output terminal, inverting or not inverting the second output signal as it was in the clock period preceding the reading clock pulse according to the state ascertained in the preceding operation.

5. The method in accordance with claim 3, wherein there are chosen a first signal, a second signal and a third signal in order to obtain a first encoded signal and a second encoded signal and wherein the encoding comprises the following operations:
monitoring the first, the second and the third signal to ascertain whether their state does or does not change between two successive clock pulses,
generating the first encoded signal and the second encoded signal in accordance with the following criterion:
when the first signal has not changed in the clock period preceding the reading clock pulse, the first encoded signal and the second encoded signal are equal to, respectively, the second signal and the third signal delayed by one clock period,
when the first signal has changed in the clock period preceding the reading clock pulse,
the second encoded signal is equal to the third signal read in a predetermined time interval in the clock period preceding the reading clock pulse and
the first encoded signal is the inverse of the second signal read in the predetermined time interval when the second signal and the third signal have not changed in the clock period preceding the reading clock pulse, otherwise it is equal to the second signal read in the predetermined time interval and
wherein the encoding comprises the following operations:
reading the first encoded signal and the second encoded signal arriving from the transmission bus on the reading edge of the clock pulse following the one in which the encoding was effected and sending them, respectively, to a first and a second output terminal as first and second output signal,
monitoring the first and the second encoded signal to ascertain whether their state has or has not changed in the predetermined time interval and
reconstructing the first signal as second output signal on a second output terminal by not inverting the second output signal as it was in the clock period preceding the reading clock pulse when neither the second nor the third signal has changed after the previous operation or inserting it when at least one of the second and the third signal has changed.

6. A circuit system for the synchronous transmission on a bus of m leads of n binary signals, where m<n, comprising a clock pulse generator, an encoder and a decoder, wherein:
the encoder comprises:
a multiplicity of input terminals capable of receiving the n signals, including at least a first and a second signal selected for encoding the first signal on the second signal, at least one output terminal connected to a lead of the bus to transmit an encoded signal and first logic means capable of:
monitoring the first signal and the second signal in order to ascertain whether their state does or does not change between two successive clock pulses,
generating the encoded signal in accordance with the following criterion:
when the first signal has not changed in the clock period preceding the reading clock pulse, the encoded signal is equal to the second signal delayed by one clock period, and
when the first signal has changed in the clock period preceding the reading clock pulse, the encoded signal is a signal that differs from the second signal by the fact that, in the predetermined time interval of the clock period preceding every reading clock pulse, it is inverted when the second signal has not changed or has changed in the clock period preceding the reading clock pulse, otherwise, when the second signal has changed in the clock period preceding the reading clock pulse, in the same predetermined time interval it remains equal to the second signal, and the decoder comprises at least one input terminal connected to a lead of the bus to receive an encoded signal, a multiplicity of output terminals, including at least two terminals for two output signals corresponding to the first and the second signal selected for encoding and logic means capable of:

reading the encoded signal arriving from the lead of the transmission bus on the reading edge of clock pulse following the clock pulse during which the encoding was effected and sending it as first output signal to a first output terminal, monitoring the encoded signal to ascertain whether its state has or has not changed during the predetermined time interval, and reconstructing the first signal as second output signal at a second output terminal, inverting or not inverting the second output signal in the clock period preceding the reading clock pulse in accordance with the state ascertained by the previous operation.

7. A method for encoding a first digital signal onto a second digital signal, comprising:

generating an output signal having a state at a given clock signal edge which matches a state of the second digital signal and having a transition or not in state occurring in a time period preceding the given clock signal edge that is indicative of a state of the first digital signal.

8. The method according to claim 7, wherein the given clock signal edge is a leading edge and the time period preceding is an interval between a leading and trailing edges of a preceding clock pulse.

9. The method according to claim 7, wherein the output signal state at the given clock signal edge is the state of the second digital signal delayed by one clock period and any transition in the output signal during the time period preceding the given clock signal edge indicates a change in state of the first digital signal.

10. The method according to claim 7, wherein generating comprises:

setting the output signal state equal to the second signal delayed by one clock period when the first signal does not change state during the time period preceding the given clock signal edge;

transitioning the output signal state during the time period preceding the given clock signal edge when the first signal changes state during the clock period preceding the reading clock pulse.

11. The method according to claim 10, wherein transitioning comprises setting the output signal state to be inverted in the time period preceding the clock signal edge when the second signal has not changed state in the time period preceding the clock signal edge, and otherwise setting the output signal state to equal the second signal in the time period preceding the clock signal edge when the second signal has changed in the clock period preceding the reading clock pulse.

12. A method for decoding an encoded digital signal, comprising:

generating a first output signal having a state at a given clock signal edge which matches a state of the encoded digital signal; and generating a second output signal having a state having a state that is indicated by a transition or not in state of the encoded digital signal which occurs in a time period preceding the given clock signal edge.

13. The method according to claim 12, wherein the given clock signal edge is a leading edge and the time period preceding is an interval between a leading and trailing edges of a preceding clock pulse.

14. The method according to claim 12, wherein the steps of generating comprise:

reading the encoded digital signal at the given clock signal edge to generate the first output signal;

monitoring the encoded digital signal to determine whether its state changed during the time period preceding the given clock signal edge; and producing the second output signal through selective inverting thereof in accordance with the monitored state change.

15. An encoder for encoding a first digital signal onto a second digital signal, comprising:

a first circuit that controls a state of an output digital to match a state of the second digital signal at a given clock signal edge; and a second circuit that controls the state of the output digital signal to transition or not during a time period preceding the given clock signal edge in a manner which is indicative of a state of the first digital signal.

16. The encoder according to claim 15, wherein the given clock signal edge is a leading edge and the time period preceding is an interval between a leading and trailing edges of a preceding clock pulse.

17. The encoder according to claim 15, wherein the output signal state at the given clock signal edge is the state of the second digital signal delayed by one clock period and any transition in the output signal during the time period preceding the given clock signal edge indicates a change in state of the first digital signal.

18. The encoder according to claim 15, wherein:

the first circuit sets the output signal state equal to the second signal delayed by one clock period when the first signal does not change state during the time period preceding the given clock signal edge; and the second circuit transitions the output signal state during the time period preceding the given clock signal edge when the first signal changes state during the clock period preceding the reading clock pulse.

19. A decoder for decoding an encoded digital signal, comprising:

a first circuit that generates a first output signal having a state at a given clock signal edge which matches a state of the encoded digital signal; and a second circuit that generates a second output signal having a state having a state that is indicated by a transition or not in state of the encoded digital signal which occurs in a time period preceding the given clock signal edge.

20. The decoder according to claim 19, wherein the given clock signal edge is a leading edge and the time period preceding is an interval between a leading and trailing edges of a preceding clock pulse.

21. The decoder according to claim 19, wherein the first circuit reads the encoded digital signal at the given clock signal edge to generate the first output signal; and wherein the second circuit monitors the encoded digital signal to determine whether its state changed during the time period preceding the given clock signal edge, and produces the second output signal through selective inverting thereof in accordance with the monitored state change.

* * * * *